H. W. JENNER.
LOCK NUT.
APPLICATION FILED NOV. 3, 1914.
1,150,197.
Patented Aug. 17, 1915.
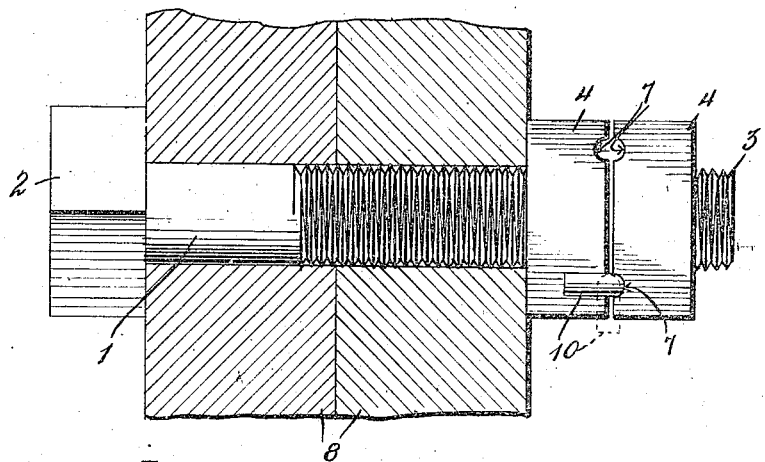
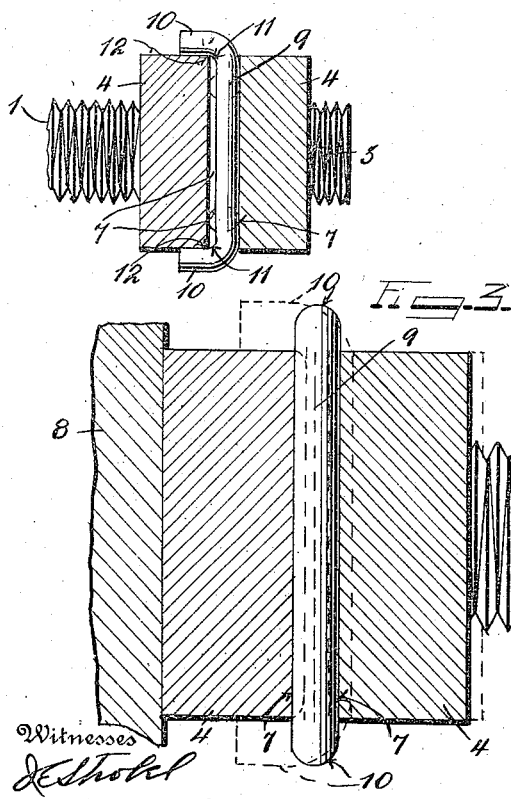
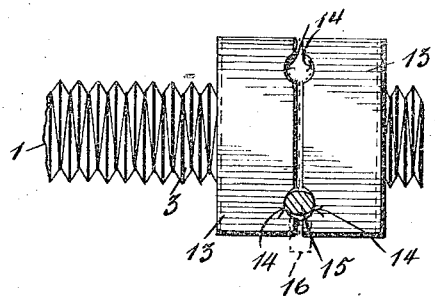
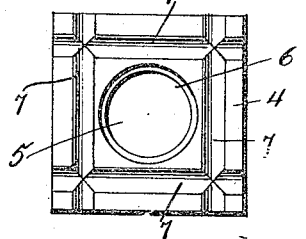
Inventor
H. W. Jenner.
his Attorneys.

UNITED STATES PATENT OFFICE.

HORACE W. JENNER, OF SUMNER, ILLINOIS.

LOCK-NUT.

1,150,197.

Specification of Letters Patent.

Patented Aug. 17, 1915.

Application filed November 3, 1914. Serial No. 870,114.

*To all whom it may concern:*

Be it known that I, HORACE W. JENNER, a citizen of the United States of America, residing at Sumner, in the county of Lawrence and State of Illinois, have invented certain new and useful Improvements in Lock-Nuts, of which the following is a specification, reference being had therein to the accompanying drawing.

This invention relates to a lock nut and has for its principal object the production of a simple and efficient means for positively locking the nuts in a set position after the same have been threaded upon the bolt.

Another object of this invention is the production of a lock nut having a key which is so formed as to be carried between the nuts and to be turned for forcing the nuts apart and binding the same in engagement with the threads of the bolt for positively locking the nuts thereon.

With these and other objects in view, this invention consists of certain novel combinations, constructions, and arrangements of parts as will be hereinafter fully described and claimed.

In the accompanying drawing:—Figure 1 is a side elevation of the improved lock nut showing the same carried by a support. Fig. 2 is a fragmentary sectional view of the device showing the same in an assembled position. Fig. 3 is an enlarged sectional view of the lock nut showing the key prior to being turned to a locked position. Fig. 4 is an elevation of the inner face of one of the nuts. Fig. 5 is a plan view of the lock nut showing a slightly modified form of the invention.

Referring to the accompanying drawing by numerals 1 designates the bolt having the usual head 2 and the threaded portion 3. This threaded portion 3, it will be seen, is formed to provide right and left hand threads which intersect each other so as to allow nuts having right and left hand threaded portions to be threaded thereon.

Each nut 4 is provided with an opening 5 having internal threads 6. These threads 6 may be either right or left hand threads but in order to form an operative device it is necessary in using a pair of these nuts to have the same oppositely threaded. Cross grooves 7 are formed upon the inner faces of the nuts and these cross grooves extend parallel with the outer side faces of the nut so as to intersect each other as clearly shown in Fig. 4. In order to lock the nuts in position, one of the same is first positioned upon the threaded end 3 of the bolt 1 until it comes into engagement with the supports 8. The key 9 is then positioned in one of the grooves 7 at which time the other nut is threaded into engagement with the bolt. Since these nuts are oppositely threaded, they will of course be rotated in opposite directions to be positioned upon the bolt 1. When the last-mentioned nut is threaded until the same abuts against the first nut, the key 9 will be positioned within one of the grooves of each nut.

By referring to Fig. 2 it will be seen that this key comprises a straight body portion having the ends 10 bent to extend at right angles thereto to form lips. When the nuts are threaded upon the bolts so as to come into engagement with each other, the angular ends or lips 10 of the key will extend out toward the side faces of the nuts as clearly shown in dotted lines in Fig. 1. At this time, the key may be swung by means of one of the lips 10 to the position disclosed in dotted lines in Fig. 3 and in full lines in Figs. 1 and 2. This action will force the outer nut away from the inner nut as shown in Fig. 3, for a slight distance so as to positively bind upon the threads 3 of the bolt 1. This action is accomplished by the curved portion 11 formed by the bending of the angular ends of lips 10. These curved portions 11 bear upon the edges 12 of one of the nuts adjacent the end portions of one of the grooves 7. As these curved portions 11 ride upon the edges 12, it will be necessary for the key body 9 to move slightly from the nut over which the angular ends or lips 10 are being swung in order to provide an additional space for the breadth or width of the nut. It will be impossible to accommodate this width of the nut upon the curved portions 11 owing to the fact that these curved portions are formed so as to communicate with the body of the key and that their inner portions are considerably smaller as clearly shown in Fig. 2 than the breadth of the nut. As the key 9 is forced away the lips or angular ends 10 will extend transversely of one of the nuts while the body of the key will be moved for a spaced distance from the inner portions of the groove of this particular nut. As this key 9 moves slightly outwardly, it will, of course, be bearing upon the remaining nut and will thereby force the remaining nut slightly outwardly for a spaced distance from the inner nut as clearly shown in Fig. 1. This action will cause both nuts to bind firmly upon the threads of the bolt and consequently they will also bear firmly upon the key. In this operation the key will be positively held in a set position while the nuts will be prevented from accidental displacement, provided they were accidentally struck so as to rotate one of the same and the key were not provided with the angular ends or lips.

By referring to Fig. 3 the specific action of the lock nut is disclosed first in full lines at which time the angular ends or lips extend to one side of the nuts so as to allow the nuts to come into engagement with each other at which time the key is swung as shown in dotted lines in this figure while the outer nut is forced slightly outwardly but of course only for a distance allowed by the threads. By this shifting of the nuts apart, they will bind upon the right and left threads whereby the several portions of the device will be efficiently locked in position.

By referring to Fig. 5 it will be seen that the threads 3 of the bolt 1 are adapted to carry the nuts 13 having grooves 14 formed therein which are substantially elliptical in cross section. The key used in connection with this form of the device comprises an elliptical body 15 upon which the usual angular ends may be formed as indicated at 16 in Fig. 5, in dotted lines. This form of the structure is assembled similar to the preferred form thereof but it will be seen that when the key is turned, it will not only bind at the portions adjacent the angular ends 16 but their elliptical bodies will also assist in forcing the nuts apart and causing the nuts to have a locking action upon the threads 3 of the bolt.

From the foregoing description it will be seen that a very simple and efficient lock nut has been produced wherein the key is turned for forcing the nuts apart for a distance allowed by the threads of the bolt whereby the nuts will be positively locked on the bolt and will retain the key in a locked position for preventing the several portions from becoming loose and thereby accidentally disengaging each other.

What I claim is:—

1. A lock nut of the class described comprising a bolt having right and left threads, a pair of nuts carried upon the threaded portions of said bolts, said nuts provided with registering grooves, a key positioned within a pair of said grooves, said key comprising a straight body having end formed integral thereon and extending at right angles thereto, said ends and body having curved portions formed at their junctions whereby when said key is swung the curved portions will ride upon the edges of one of said nuts adjacent the outer side faces thereof and will cause the body portion of the key to be urged outwardly from the nut over which said angular ends are being swung whereby said body portion of the key will be forced upon the remaining nut so as to force the same slightly outwardly into a positive binding action with the threads of the bolt for retaining the nuts and the key in their locked positions.

2. A lock nut of the class described comprising a bolt having right and left threads, a pair of nuts positioned upon said bolt and provided with registering grooves, said grooves being substantially elliptical in cross section, a key positioned within a pair of said grooves, said key having an elliptical body in cross section, and terminating in angularly extending ends, said body resting snugly within said grooves when the nuts are threaded into engagement with each other, said key being adapted to be swung by means of said angular ends so as to spread the nuts apart whereby the nuts will bind upon the threaded portions of said bolt for positively resisting any tendency of said nuts to accidentally rotate upon said bolt, said ends binding upon the outer side faces of one of said nuts for holding the elliptical body of said key in a set position thereby causing said nuts and said key to remain in a positive locked engagement with each other.

In testimony whereof I hereunto affix my signature in presence of two witnesses.

HORACE W. JENNER.

Witnesses:
HENRY M. WILLIAMS,
J. FRANK WHYTE.